US007194641B2

(12) United States Patent
Hack

(10) Patent No.: US 7,194,641 B2
(45) Date of Patent: Mar. 20, 2007

(54) METHOD AND APPARATUS FOR MANAGING POWER AND THERMAL ALERTS TRANSPARENTLY TO AN OPERATING SYSTEM IN A DATA PROCESSING SYSTEM WITH INCREASED GRANULARITY IN REDUCING POWER USAGE AND THERMAL GENERATION

(75) Inventor: Mark Elliott Hack, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 10/763,095

(22) Filed: Jan. 22, 2004

(65) Prior Publication Data

US 2005/0166075 A1 Jul. 28, 2005

(51) Int. Cl.
*G06F 1/00* (2006.01)
(52) U.S. Cl. ............... 713/300; 713/322; 713/324; 713/340; 713/600; 714/13; 700/2
(58) Field of Classification Search ............... 713/300, 713/322, 324, 340, 600; 700/2; 714/13
See application file for complete search history.

(56) References Cited

U.S. PATENT DOCUMENTS 5,630,110 A * 5/1997 Mote, Jr. ............... 713/501
5,974,557 A * 10/1999 Thomas et al. ............ 713/322
6,718,474 B1 * 4/2004 Somers et al. ............ 713/322
6,901,522 B2 5/2005 Buch
7,036,009 B2 4/2006 Hiramoto
2002/0016812 A1 * 2/2002 Uchishiba et al. ......... 709/104
2002/0156824 A1 * 10/2002 Armstrong et al. ........ 709/104
2003/0217088 A1 * 11/2003 Takamoto .................. 709/1
2004/0107369 A1 * 6/2004 Cooper et al. ............ 713/300
2004/0153749 A1 * 8/2004 Schwarm et al. ............ 714/11
2005/0049729 A1 * 3/2005 Culbert et al. ............. 700/50
2005/0125580 A1 * 6/2005 Madukkarumukumana et al. ........................ 710/200

* cited by examiner

*Primary Examiner*—Thomas Lee
*Assistant Examiner*—Sean Weinman
(74) *Attorney, Agent, or Firm*—Duke W. Yee; Diana R. Gerhardt; Wayne P. Bailey

(57) ABSTRACT

A method, apparatus, and computer instructions for managing a set of devices in the data processing system. An alert is received through an external alert mechanism. The alert is at least one of a power alert and a thermal alert. In response to the alert, operation of a selected device within the set of devices is altered such that at least one of power usage and generation of heat by the selected device is reduced or restored to normal operation. The mapping of the reduced physical resources to logical resources is performed with no operating system intervention.

28 Claims, 4 Drawing Sheets

200 DATA PROCESSING SYSTEM

METHOD AND APPARATUS FOR MANAGING POWER AND THERMAL ALERTS TRANSPARENTLY TO AN OPERATING SYSTEM IN A DATA PROCESSING SYSTEM WITH INCREASED GRANULARITY IN REDUCING POWER USAGE AND THERMAL GENERATION

CROSS REFERENCE TO RELATED APPLICATIONS

The present invention is related to an application entitled Method and Apparatus for Reducing Power Consumption in a Logically Partitioned Data Processing System, Ser. No. 10/763094, filed even date hereof, assigned to the same assignee, and incorporated herein by reference.

BACKGROUND OF THE INVENTION

1. Technical Field

The present invention relates generally to an improved data processing system and in particular to a method and apparatus for processing data. Still more particularly, the present invention provides a method, apparatus, and computer instructions for handling alerts for power and thermal events.

2. Description of Related Art

Servers continue to get faster and include more processors at a rapid pace. With these changes, the problem of heat dissipation increases. The problem with heat dissipation increases as the density of servers increase. For example, the number of servers that may be located in a particular area increases when the servers are mounted on racks, rather than being placed on a table or on the floor. Consequently, many companies are using heat dissipation as a criteria for purchasing computers, since it is becoming more difficult to cool server farms with a large number of processors. The decision to either use high performance systems with expensive cooling systems or use low powered processors with lower performance currently has to be made by companies and consumers.

High performance computers in high densities, such as those placed into rack systems, may overheat and have system failures. More specifically, these failures may include system crashes, resulting in hardware damage. Overheating causes increased risk of premature failure of processors, chips, and disk drives.

Currently, monitoring systems are used to monitor server computers. Many computers have integrated temperature monitoring. Some computers include a temperature monitoring utility that allows the temperature of a processor to be checked or monitored.

Currently, problems with heat dissipation may be reduced using a cooling system, such as a liquid cooling system available for rack mounted servers. This type of cooling system achieves efficient heat exchange through the mounting of a refrigeration cycle in the rack containing the servers, and connecting a cooling pipe from the servers to a cooling liquid circulation pipe mounted in the rack. Although cooling systems may aid in heat dissipation, these types of systems are expensive and are subject to failures.

In addition to problems with thermal dissipation, the high density of servers in server farms result in the consumption of large amounts of power. In some cases, the power consumed may overload power circuits for a server farm. In such a case, the power supply may fail causing the entire server farm to shut down. One solution for managing power overloads is to shut down one or more servers on a rack in a server farm to reduce power consumption. Currently, the process for handling a thermal or power problem involves alerting the operating system and powering off the server system to prevent the power or thermal overload. Such a procedure is initiated when the power consumption increases beyond some acceptable threshold. This process also is initiated for thermal conditions when other methods, such as increasing air flow or the use of liquid cooling systems have not provided the required relief for the overload condition.

Therefore, it would be advantageous to have an improved method, apparatus, and computer instructions for managing power and thermal events without shutting down a data processing system.

SUMMARY OF THE INVENTION

The present invention provides a method, apparatus, and computer instructions for managing a set of devices in the data processing system. An alert is received through an external alert mechanism. The alert is at least one of a power alert and a thermal alert. In response to the alert, operation of a selected device within the set of devices is altered such that at least one of power usage and generation of heat by the selected device is reduced or restored to normal operation. The mapping of the reduced physical resources to logical resources is performed with no operating system intervention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
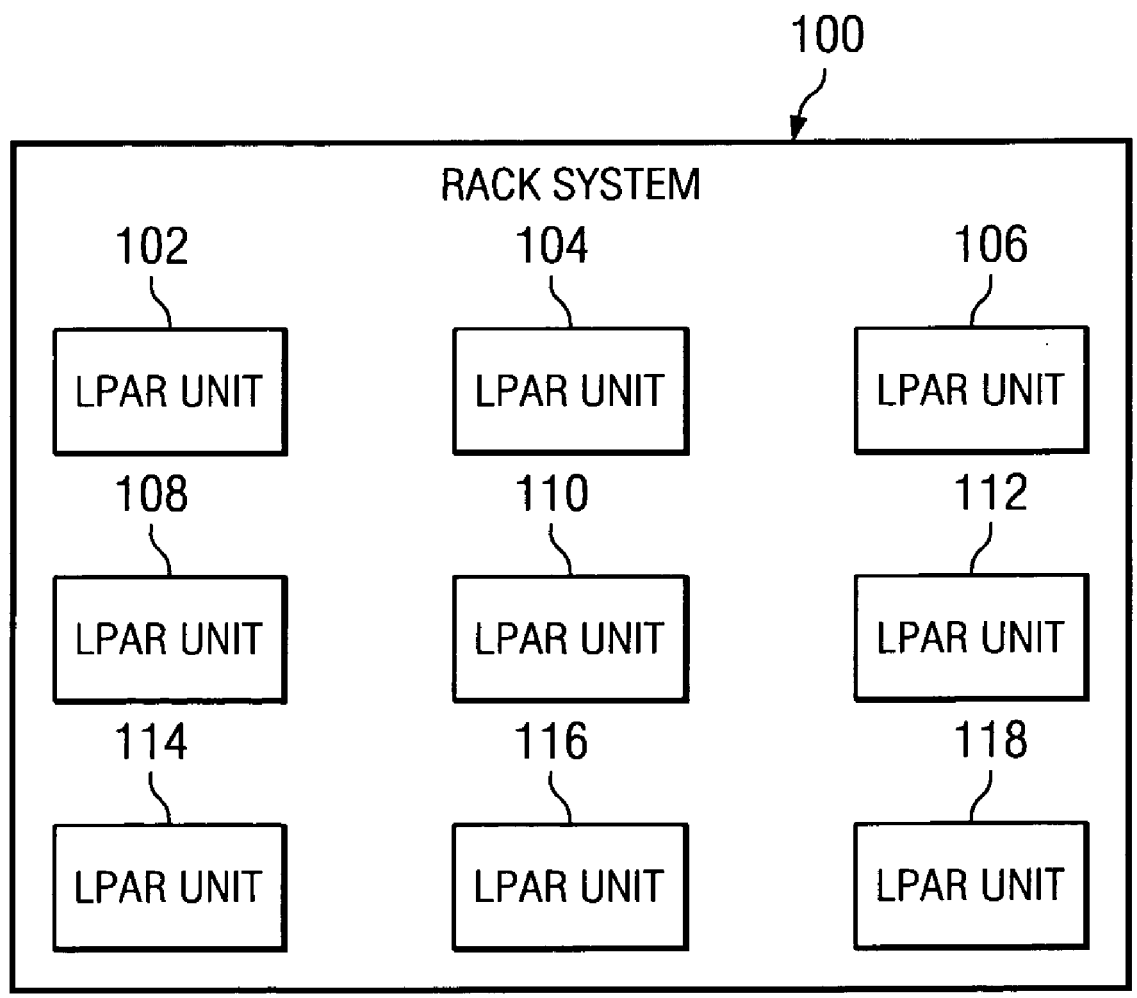
FIG. 1 is a diagram illustrating a set of data processing systems in accordance with a preferred embodiment of the present invention.

With reference now to the figures, and in particular with reference to FIG. 1, a diagram illustrating a set of data processing systems is depicted in accordance with a preferred embodiment of the present invention. Rack system 100 contains data processing systems in the form of logical partitioned (LPAR) units 102, 104, 106, 108, 110, 112, 114, 116, and 118. Rack system 100 allows for a higher density of data processing systems by allowing these systems to be mounted on top of each other and beside each other on a rack. In these examples, rack system 100 is located within a server farm. The server farm may include many rack systems, such as rack system 100 to hold hundreds or thousands of data processing systems.

As illustrated, these data processing systems in rack system 100 are logical partitioned units or data processing systems. These systems have a logical partitioned functionality within a data processing system, which allows multiple copies of a single operating system or multiple heterogeneous operating systems to be simultaneously run on a single data processing system platform. A partition, within which an operating system image runs, is assigned a non-overlapping subset of the platform's resources. This platform's allocatable resources includes one or more architecturally distinct processors with their interrupt management area, regions of system memory, and input/output (I/O) adapter bus slots. The partition's resources are represented by the platform's firmware to the operating system image.

Each distinct operation system or image of an operating system running within a platform is protected from each other such that software errors on one logical partition cannot affect the correct operations of any of the other partitions. This protection is provided by allocating a disjointed set of platform resources to be directly managed by each operating system image and by providing mechanisms for insuring that the various images cannot control any resources that have not been allocated to that image. Furthermore, software errors in the control of an operating system's allocated resources are prevented from affecting the resources of any other image. Thus, each image of the operating system or each different operating system directly controls a distinct set of allocatable resources within the platform. With respect to hardware resources in a logical partitioned data processing system, these resources are disjointly shared among various partitions. These resources may include, for example, input/output (I/O) adapters, memory DIMMS, non-volatile random access memory (NVRAM), and hard disk drives. Each partition within an LPAR data processing system may be booted and shut down over and over without having to power-cycle the entire data processing system.

The present invention provides a method, apparatus, and computer instructions for managing power and thermal events. In these examples, a power event is a message or some other signal that indicates power consumption has exceeded some selected level or threshold. A thermal event is a message or some other signal that indicates that a thermal condition, such as the temperature, has exceeded a selected level of threshold or has returned to normal operating levels. The mechanism of the present invention uses sub-processor partitioning calls used in LPAR data processing systems to manage devices using power or generating heat. Sub-processor partitioning calls are a set of calls used to allow for the allocation of a single physical processor to one or more logical processors. These calls include, for example, calls requesting the use of a logical processor and calls ceding the use of a logical processor. Of course, the mechanism of the present invention may be implemented using any alert mechanism including those independent of processor partitioning. In these illustrative examples, the devices are processors. The mechanism of the present invention may reduce power consumption and heat generation in a number of ways, including placing the processor into a sleep mode or reducing the clock frequency.

Figure 2:
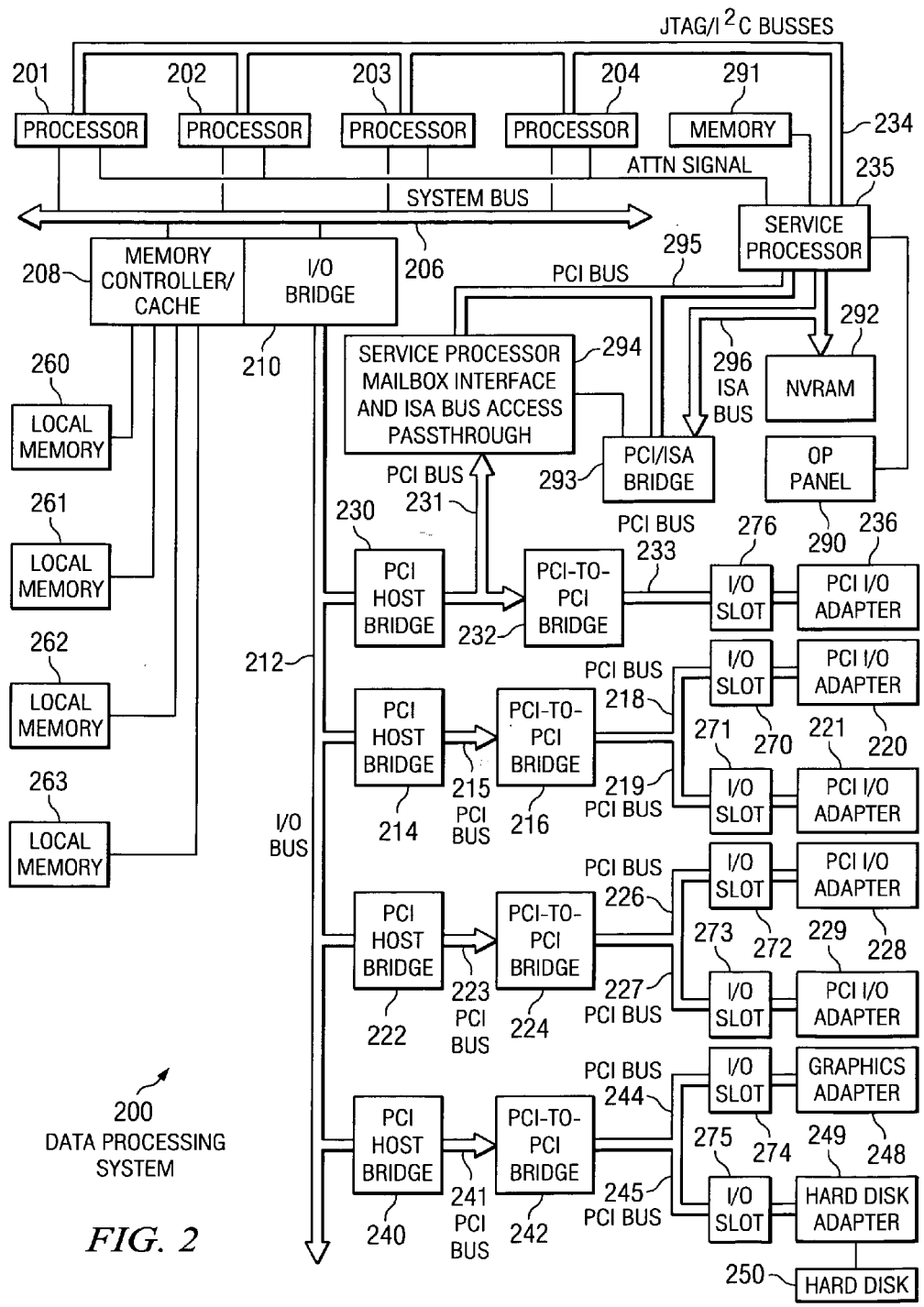
FIG. 2 is a block diagram of a data processing system in which the present invention may be implemented.

Turning next to FIG. 2, a block diagram of a data processing system in which the present invention may be implemented is depicted. Data processing system 200 may be a symmetric multiprocessor (SMP) system including a plurality of processors 201, 202, 203, and 204 connected to system bus 206. For example, data processing system 200 may be an IBM eServer, a product of International Business Machines Corporation in Armonk, N.Y., implemented as a server within a network. Alternatively, a single processor system may be employed. Also connected to system bus 206 is memory controller/cache 208, which provides an interface to a plurality of local memories 260–263. I/O bus bridge 210 is connected to system bus 206 and provides an interface to I/O bus 112. Memory controller/cache 208 and I/O bus bridge 210 may be integrated as depicted.

Data processing system 200 is a logical partitioned (LPAR) data processing system. Thus, data processing system 200 may have multiple heterogeneous operating systems (or multiple instances of a single operating system) running simultaneously. Each of these multiple operating systems may have any number of software programs executing within it. Data processing system 200 is logically partitioned such that different PCI I/O adapters 220–221, 228–229, and 236, graphics adapter 248, and hard disk adapter 249 may be assigned to different logical partitions. In this case, graphics adapter 248 provides a connection for a display device (not shown), while hard disk adapter 249 provides a connection to control hard disk 250.

Thus, for example, suppose data processing system 200 is divided into three logical partitions, P1, P2, and P3. Each of PCI I/O adapters 220–221, 228–229, 236, graphics adapter 248, hard disk adapter 249, each of host processors 201–204, and memory from local memories 260–263 is assigned to each of the three partitions. In these examples, memories 260–263 may take the form of dual in-line memory modules (DIMMs). DIMMs are not normally assigned on a per DIMM basis to partitions. Instead, a partition will get a portion of the overall memory seen by the platform. For example, processor 201, some portion of memory from local memories 260–263, and I/O adapters 220, 228, and 229 may be assigned to logical partition P1; processors 202–203, some portion of memory from local memories 260–263, and PCI I/O adapters 221 and 236 may be assigned to partition P2; and processor 204, some portion of memory from local memories 260–263, graphics adapter 248 and hard disk adapter 149 may be assigned to logical partition P3.

Each operating system executing within data processing system 200 is assigned to a different logical partition. Thus, each operating system executing within data processing system 200 may access only those I/O units that are within its logical partition. Thus, for example, one instance of the Advanced Interactive Executive (AIX) operating system may be executing within partition P1, a second instance (image) of the AIX operating system may be executing within partition P2, and a Windows XP operating system may be operating within logical partition P3. Windows XP is a product and trademark of Microsoft Corporation of Redmond, Wash.

Peripheral component interconnect (PCI) host bridge 214 connected to I/O bus 212 provides an interface to PCI local bus 215. A number of PCI input/output adapters 220–221 may be connected to PCI bus 215 through PCI-to-PCI bridge 216, PCI bus 218, PCI bus 219, I/O slot 270, and I/O slot 271. PCI-to-PCI bridge 216 provides an interface to PCI bus 218 and PCI bus 219. PCI I/O adapters 220 and 221 are placed into I/O slots 270 and 271, respectively. Typical PCI bus implementations will support between four and eight I/O adapters (i.e. expansion slots for add-in connectors). Each PCI I/O adapter 220–221 provides an interface between data processing system 200 and input/output devices such as, for example, other network computers, which are clients to data processing system 200.

An additional PCI host bridge 222 provides an interface for an additional PCI bus 223. PCI bus 223 is connected to a plurality of PCI I/O adapters 228–229. PCI I/O adapters 228–229 may be connected to PCI bus 223 through PCI-to-PCI bridge 224, PCI bus 226, PCI bus 227, I/O slot 272, and I/O slot 273. PCI-to-PCI bridge 224 provides an interface to PCI bus 226 and PCI bus 227. PCI I/O adapters 228 and 229 are placed into I/O slots 272 and 273, respectively. In this manner, additional I/O devices, such as, for example, modems or network adapters may be supported through each of PCI I/O adapters 228–229. In this manner, data processing system 200 allows connections to multiple network computers.

A memory mapped graphics adapter 248 inserted into I/O slot 274 may be connected to I/O bus 212 through PCI bus 244, PCI-to-PCI bridge 242, PCI bus 241 and PCI host bridge 240. Hard disk adapter 249 may be placed into I/O slot 275, which is connected to PCI bus 245. In turn, this bus is connected to PCI-to-PCI bridge 242, which is connected to PCI host bridge 240 by PCI bus 241.

A PCI host bridge 230 provides an interface for a PCI bus 231 to connect to I/O bus 212. PCI I/O adapter 236 is connected to I/O slot 276, which is connected to PCI-to-PCI bridge 232 by PCI bus 233. PCI-to-PCI bridge 232 is connected to PCI bus 231. This PCI bus also connects PCI host bridge 230 to the service processor mailbox interface and ISA bus access pass-through logic 294 and PCI-to-PCI bridge 232. Service processor mailbox interface and ISA bus access pass-through logic 294 forwards PCI accesses destined to the PCI/ISA bridge 293. NVRAM storage 292 is connected to the ISA bus 296. Service processor 235 is coupled to service processor mailbox interface and ISA bus access pass-through logic 294 through its local PCI bus 295. Service processor 235 is also connected to processors 201–204 via a plurality of JTAG/I²C busses 234. JTAG/I²C busses 234 are a combination of JTAG/scan busses (see IEEE 1149.1) and Phillips I²C busses. However, alternatively, JTAG/I²C busses 234 may be replaced by only Phillips I²C busses or only JTAG/scan busses. All SP-ATTN signals of the host processors 201, 202, 203, and 204 are connected together to an interrupt input signal of the service processor. The service processor 235 has its own local memory 291, and has access to the hardware OP-panel 290.

When data processing system 200 is initially powered up, service processor 235 uses the JTAG/I²C busses 234 to interrogate the system (host) processors 201–204, memory controller/cache 208, and I/O bridge 210. At completion of this step, service processor 235 has an inventory and topology understanding of data processing system 200. Service processor 235 also executes Built-In-Self-Tests (BISTs), Basic Assurance Tests (BATs), and memory tests on all elements found by interrogating the host processors 201–204, memory controller/cache 208, and I/O bridge 210. Any error information for failures detected during the BISTs, BATs, and memory tests are gathered and reported by service processor 235.

If a meaningful/valid configuration of system resources is still possible after taking out the elements found to be faulty during the BISTs, BATS, and memory tests, then data processing system 200 is allowed to proceed to load executable code into local (host) memories 260–263. Service processor 235 then releases host processors 201–204 for execution of the code loaded into local memory 260–263. While host processors 201–204 are executing code from respective operating systems within data processing system 200, service processor 235 enters a mode of monitoring and reporting errors. The type of items monitored by service processor 235 include, for example, the cooling fan speed and operation, thermal sensors, power supply regulators, and recoverable and non-recoverable errors reported by processors 201–204, local memories 260–263, and I/O bridge 210.

Service processor 235 is responsible for saving and reporting error information related to all the monitored items in data processing system 200. Service processor 235 also takes action based on the type of errors and defined thresholds. For example, service processor 235 may take note of excessive recoverable errors on a processor's cache memory and decide that this is predictive of a hard failure. Based on this determination, service processor 235 may mark that resource for deconfiguration during the current running session and future Initial Program Loads (IPLs). IPLs are also sometimes referred to as a "boot" or "bootstrap".

Data processing system 200 may be implemented using various commercially available computer systems. For example, data processing system 200 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
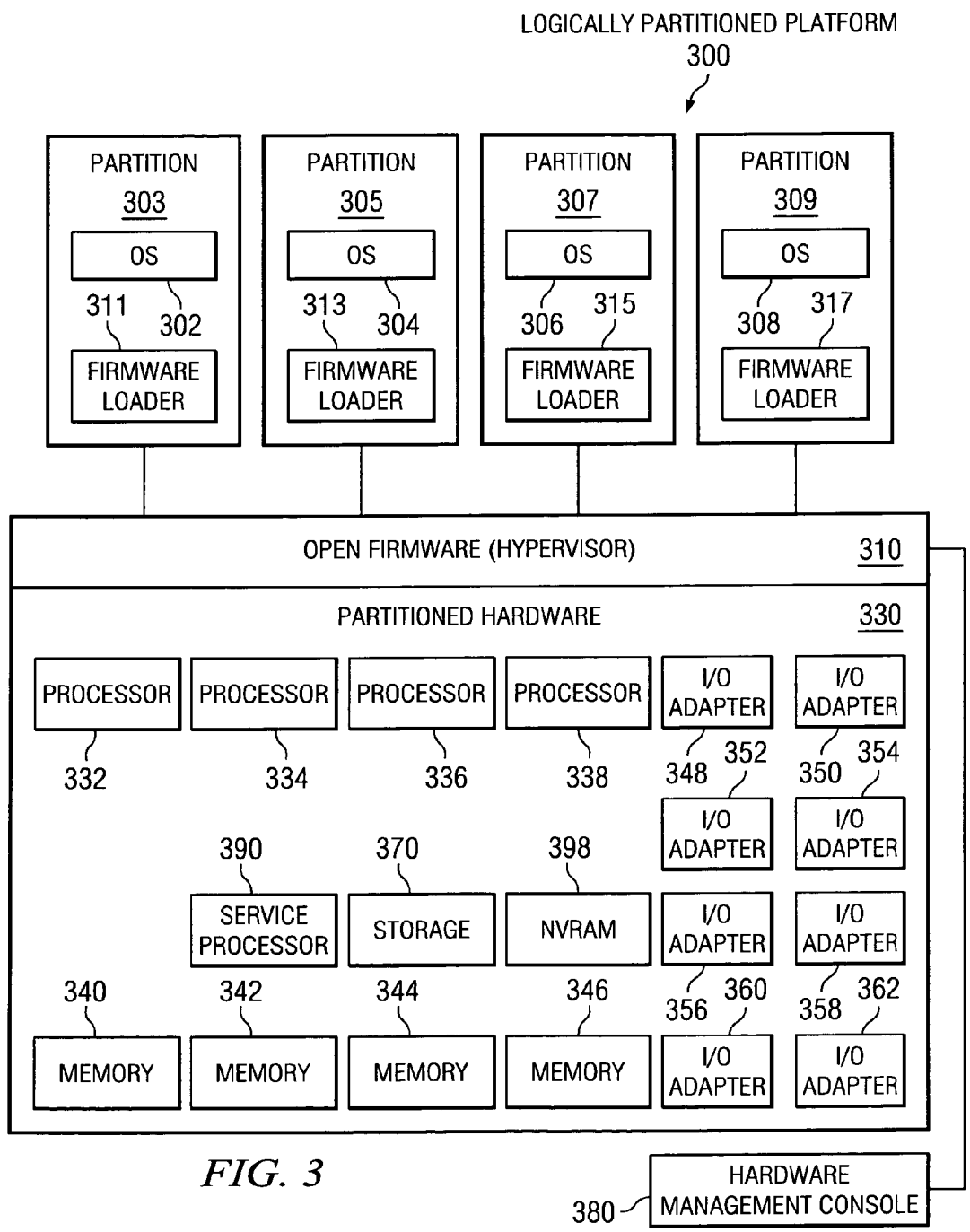
FIG. 3 is a block diagram of an exemplary logical partitioned platform in which the present invention may be implemented.

With reference now to FIG. 3, a block diagram of an exemplary logical partitioned platform is depicted in which the present invention may be implemented. The hardware in logical partitioned platform 300 may be implemented as, for example, data processing system 200 in FIG. 2. Logical partitioned platform 300 includes partitioned hardware 330, operating systems 302, 304, 306, 308, and hypervisor 310. Operating systems 302, 304, 306, and 308 may be multiple copies of a single operating system or multiple heterogeneous operating systems simultaneously run on platform 300. These operating systems may be implemented using OS/400, which are designed to interface with a hypervisor. Operating systems 302, 304, 306, and 308 are located in partitions 303, 305, 307, and 309.

Additionally, these partitions also include firmware loaders 311, 313, 315, and 317. Firmware loaders 311, 313, 315, and 317 may be implemented using IEEE-1275 Standard Open Firmware and runtime abstraction software (RTAS), which is available from International Business Machines Corporation. When partitions 303, 305, 307, and 309 are instantiated, a copy of the open firmware is loaded into each partition by the hypervisor's partition manager. The logical processors associated or assigned to the partitions are then dispatched to the partition's memory to execute the partition firmware.

Partitioned hardware 330 includes a plurality of processors 332–338, a plurality of system memory units 340–346, a plurality of input/output (I/O) adapters 348–362, and a storage unit 370. Partitioned hardware 330 also includes service processor 390, which may be used to provide various services, such as processing of errors in the partitions. Each of the processors 332–338, memory units 340–346, NVRAM storage 398, and I/O adapters 348–362 may be assigned to one of multiple partitions within logical partitioned platform 300, each of which corresponds to one of operating systems 302, 304, 306, and 308.

Partition management firmware (hypervisor) 310 performs a number of functions and services for partitions 303, 305, 307, and 309 to create and enforce the partitioning of logical partitioned platform 300. Hypervisor 310 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, hypervisor 310 allows the simultaneous execution of independent OS images 302, 304, 306, and 308 by virtualizing all the hardware resources of logical partitioned platform 300.

Operations of the different partitions may be controlled through a hardware management console, such as hardware management console 380. Hardware management console 380 is a separate data processing system from which a system administrator may perform various functions including reallocation of resources to different partitions.

Figure 4:
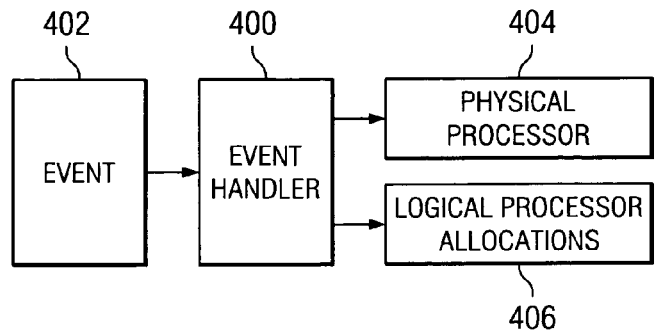
FIG. 4 is a diagram illustrating components used to handle power and thermal events in accordance with a preferred embodiment of the present invention.

Turning now to FIG. 4, a diagram illustrating components used to handle power and thermal events is depicted in accordance with a preferred embodiment of the present invention. Event handler 400 is employed to receive an event, such as event 402. Event handler 400 may then generate commands to alter the operation of devices in response to receiving event 402. In this example, the device is physical processor 404. Event handler 400 is a component or process that is found within open firmware 310 in FIG. 3, which is implemented using a hypervisor in these examples. Event handler 400 is designed to receive thermal and power events. These events may be generated through a number of different mechanisms. For example, the temperature sensor, located in the LPAR data processing system or in a room in which the LPAR data processing system is located, generates temperature data. This temperature data is compared to a threshold. If the temperature data exceeds the threshold, a thermal event is generated and sent to event handler 400. If the temperature data indicates that a prior condition where the threshold was exceeded is no longer in effect, an event is generated to indicate that the condition no longer exists. Alternatively, event 402 may include an indication of the action that is to be taken by event handler 400.

A power event may be generated in a similar fashion using a sensor that detects power usage. This power usage may be, for example, for a single LPAR data processing system or for a power circuit supplying power to an entire rack system or server farm.

When event handler 400 receives event 402, event 402 is examined and analyzed to identify and determine whether an action needs to be taken. For example, event handler 400 may determine that the operation of physical processor 404 needs to be altered to reduce power consumption or to decrease the heat generated by physical processor 404. With a thermal event, the action also may include increasing air flow or increasing the cooling provided by the cooling system.

In altering the operation of physical processor 404, event handler 400 uses sub-processor partitioning calls to alter the operation of physical processor 404. Since the system operates with virtual and not real processors, the mapping of physical to logical processors is transparent to the operating system and the removal of a physical processor from the pool of logical processors dos not require operating system intervention. This system allows for the allocation of a single physical processor to multiple logical processors effectively partitioning the physical processor. In LPAR data processing systems supporting sub-processor partitioning, a hypervisor, such as open firmware 310 in FIG. 3, presents a number of logical devices to the operating system. These devices include logical processors, which are mapped to physical processors. The operation of physical processor 404 may be altered in a number of ways, including, for example, reducing clock cycle frequency or placing physical processor 404 into a sleep mode. When a processor is in a sleep mode, the entire processor is completely shut down with only the state of the processor being stored in a dynamic random access memory (DRAM) state for quick recovery. In this mode, the external processor bus clock is stopped.

Depending on the change in operation made to physical processor 404, one or more logical processors may be unavailable for use in the data processing system. As a result, the logical to physical mapping changes. These changes may be updated in logical processor allocations 406 which take the form of a data structure, such as a table, containing a mapping of logical processors to physical processors. In this manner, less physical resources are mapped to the logical resources when the operation of physical processor 404 is changed in response to a power or thermal event. In addition, other associated tasks performed in making a processor unavailable for sub-processor partitioning are performed. These tasks include, for example, removing the ability to generate interrupts for physical processor 404.

Additional processors may be altered in operation until desired power or thermal levels are reached. When physical processor 404 is placed back into normal operation, logical processor allocations 406 may be updated to indicate that the physical resources have increased.

In this manner, the mechanism of the present invention handles thermal events in a manner that allows for operation of one or more selected devices in a data processing system to be altered to reduce power consumption or heat generation, rather than shutting down the entire data processing system. This mechanism allows for a finer granularity in reducing power usage on heat generation. As a result, the reduction in the amount of performance may be decreased slowly and thus avoid the shutting down of the entire data processing system is avoided.

Figure 5:
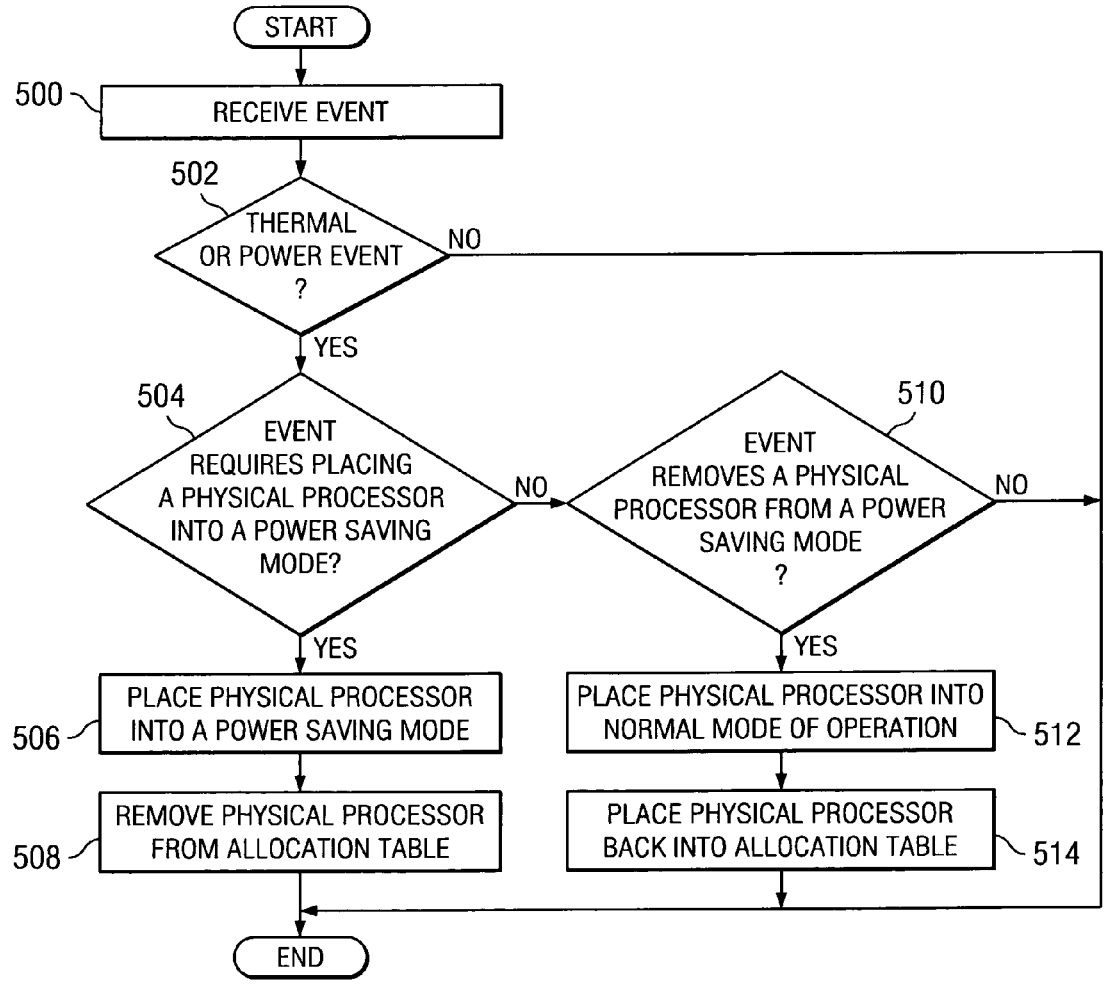
FIG. 5 is a flowchart of a process for managing thermal or power events in accordance with a preferred embodiment.

Turning now to FIG. 5, a flowchart of a process for managing thermal or power events is depicted in accordance with a preferred embodiment. The process illustrated in FIG. 5 may be implemented into an event handler, such as event handler 400 in FIG. 4.

The process begins by receiving an event (step 500). Next, a determination is made as to whether this event is a thermal or power event (step 502). This event may be, for example, event 402 in FIG. 4. The identification of the event may be made through information located in the event. For example, a numerical, alphabetical, or alphanumerical code may be used to identify the type of event. If the event is a thermal or power event, then a determination is made as to whether the event requires placing a physical processor into a power saving mode (step 504). The determination of the number of processors as well as the extent of the power reduction can be made as a function of the amount by which the parameter exceeds the threshold as well as the time for which the threshold has been exceed. This power saving mode involves altering the operation of the physical processor. For example, the clock cycle frequency may be reduced or the physical processor may be shut down or placed into a sleep mode. In these examples, any alteration within the operation of the processor may be made in which power usage or heat generation by the processor is reduced.

If the event does require the physical processor to be placed into a power saving mode, then the physical processor is now placed into a power saving mode (step 506). Next, the physical processor is removed from the allocation table (step 508), with the process terminating thereafter. This allocation table may, for example, take the form of logical processor allocations 406 in FIG. 4. Referring back to step 502 as described above, if a thermal or power event has not occurred then the process terminates. Other processing of the event may-occur, but is outside the scope of the mechanism of the present invention.

Returning to step 504 as described above, if the event does not require placing a physical processor into a power saving mode, then a determination is made as to whether the event removes a physical processor from a power saving mode (step 510). As described above, the number of processors involved and extent of the removal of the power throttling may be made on the threshold values as well as the time for which the threshold has been removed. If the event removes the physical processor from power saving mode, then the physical processor is then placed into a normal mode of operation (step 512). In step 512, placing the physical processor into the normal mode of operation may involve, for example, increasing the clock cycle frequency to the normal clock cycle frequency for the physical processor. If the physical processor is in a sleep mode, the physical processor is woken up. This process may involve, for example, restoring the external processor bus clock.

Thereafter, the physical processor is placed back into an allocation table (step 514), with the process terminating thereafter. Referring back to step 510 as described above, if the event does not remove the physical processor from a power saving mode then the process terminates. In this case, the event requires some other type of processing. For example, the event may contain more information about the cause of an alert, such as a failure of a cooling fan or cooling system. This additional information may be used to provide for more intelligent and predictive adjustments to the operation of devices in a data processing system.

Thus, the present invention provides an improved method, apparatus, and computer instructions for managing power and thermal events. The mechanism of the present invention manages these events by altering the operation of a device, such as a processor, to reduce power consumption or heat generation. This mechanism avoids having to shut down the entire data processing system and provides for finer granularity in managing power consumption and heat generation. The mechanism of the present uses sub-processor partitioning calls to alter the operation of processors to reduce power consumption and heat generation. Although the depicted examples are directed towards devices in the form of processors, the mechanism of the present invention may be applied to other physical devices presented as a logical resource to the operating system. Sub-processor partitioning calls include requests to cede a logical processor as well as for the use of one or more logical processors. Since these processors and devices are under the control of the hypervisor, the allocation of the physical resource which is used to map to the logical resource is transparent to the operating system and this determination is made by the hypervisor.

In this manner, the mechanism of the present invention allows for transparency to the operating system because the operating system does not process the alerts or calls and is not directly aware of the logical to physical mapping of processors. Further, by controlling individual processors, this mechanism also allows for the granularity in the reduction of power usage and heat generation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of, signal bearing media actually used to carry out the distribution. Examples of computer readable media include recordable-type media, such as a floppy disk, a hard disk drive, a RAM, CD-ROMS, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a logically partitioned data processing system comprising a set of physical processors configured as a set of logical processors, for managing a set of devices in the logically partitioned data processing system, the method comprising:
   receiving an alert through an alert mechanism, wherein the alert is at least one of a power alert and a thermal alert;
   altering operation of a selected physical processor within the set of physical processors in response to the alert, wherein at least one of power usage and generation of heat by the selected physical processor is reduced, wherein the altering step includes altering the operation of the selected physical processor by turning off the selected physical processor and changing, without operating system intervention, logical processor configuration of the set of logical processors to reflect the selected physical processor's altered operation.

2. The method of claim 1, wherein a single physical processor of the set of physical processors is allocated to multiple logical processors of the set of logical processors.

3. The method of claim 2, wherein the logically partitioned data processing system has multiple logical partitions, with each of the multiple logical partitions being associated with a logical processor of the set of logical processors.

4. The method of claim 2, wherein the set of physical processors are mapped to an unequal set of logical processors.

5. The method of claim 2, wherein changing the logical processor configuration includes:

assigning a corresponding logical processor mapped to the selected physical processor to another physical processor.

6. The method of claim 1, wherein the operation of the selected physical processor is altered by an event handler using a sub-processor partitioning call.

7. The method of claim 1, wherein the receiving step and the altering step are performed by a runtime abstraction layer.

8. The method of claim 1, wherein power usage and generation of heat are reduced by reducing power used by the selected physical processor.

9. A method for managing a set of physical processors mapped to a set of logical processors, the method comprising:
receiving an alert from an operating system, wherein the alert is at least one of a power alert and a thermal alert; and
altering operation of a selected physical processor within the set of physical processors in response to the alert, wherein at least one of power usage and generation of heat by the selected physical processor is reduced, wherein the altering step includes altering the operation of the selected physical processor by turning off the selected physical processor and changing, without intervention by the operating system, mapping of the set of physical processors and the set of logical processors to reflect the selected physical processor's altered operation.

10. The method of claim 9 wherein the changing step comprises:
reassigning a logical processor mapped to the selected physical processor.

11. The method of claim 10 further comprising:
altering operation of the selected physical processor back to an original state present before the alert if another alert is received canceling the alert; and
reassigning the logical processor back to the selected physical processor.

12. A logically partitioned data processing system, comprising a set of physical processors configured as a set of logical processors, for managing a set of devices in the logically partitioned data processing system, the logically partitioned data processing system comprising:
receiving means for receiving an alert, wherein the alert is at least one of a power alert and a thermal alert; and
altering means for altering operation of a selected physical processor within the set of physical processors in response to the alert, wherein at least one of power usage and generation of heat by the selected physical processor is reduced, wherein the altering means includes means for altering the operation of the selected physical processor by turning off the selected physical processor and means for changing, without operating system intervention, logical processor configuration of the set of logical processors to reflect the selected physical processor's altered operation.

13. The logically partitioned data processing system of claim 12, wherein a single physical processor of the set of physical processors is allocated to multiple logical processors of the set of logical processors.

14. The logically partitioned data processing system of claim 13, wherein the logically partitioned data processing system has multiple logical partitions, with each of the multiple logical partitions being associated with a logical processor of the set of logical processors.

15. The logically partitioned data processing system of claim 13, wherein the set of physical processors are mapped to an unequal set of logical processors.

16. The logically partitioned data processing system of claim 15, wherein the means for changing the logical processor configuration includes:
assigning means for assigning a corresponding logical processor mapped to the selected physical processor to another physical processor.

17. A data processing system for managing a set of physical processors mapped to a set of logical processors, the data processing system comprising:
receiving means for receiving an alert from an operating system, wherein the alert is at least one of a power alert and a thermal alert; and
altering means for altering operation of a selected physical processor within the set of physical processors in response to the alert, wherein at least one of power usage and generation of heat by the selected physical processor is reduced, wherein the altering means includes means for altering the operation of the selected physical processor by turning off the selected physical processor and means for changing, without intervention by the operating system, mapping of the set of physical processors and the set of logical processors to reflect the selected physical processor's altered operation.

18. The data processing system of claim 17 wherein the means for changing comprises:
reassigning means for reassigning a logical processor mapped to the selected physical processor.

19. The data processing system of claim 18 wherein the altering means is a first altering means and wherein the reassigning means is a first reassigning means further comprising:
second altering means for altering operation of the selected physical processor back to an original state present before the alert if another alert is received canceling the alert; and
second reassigning means for reassigning the logical processor back to the selected physical processor.

20. A computer program product in a computer readable medium for managing a set of devices in a data processing system, the set of devices configured as a set of logical processors, the computer program product comprising:
first instructions for receiving an alert, wherein the alert is at least one of a power alert and a thermal alert; and
second instructions for altering operation of a selected device within the set of devices in response to the alert, wherein at least one of power usage and generation of heat by the selected device is reduced, wherein the second instructions for altering includes first sub instructions for altering the operation of the selected device by turning off the selected device and second sub instructions for changing, without operating system intervention, logical processor configuration of the set of logical processors to reflect the selected device's altered operation.

21. The computer program product of claim 20, wherein a single physical processor of the set of physical processors is allocated to multiple logical processors of the set of logical processors.

22. The computer program product of claim 21, wherein the logically partitioned data processing system has multiple logical partitions, with each of the multiple logical partitions being associated with a logical processor of the set of logical processors.

23. The computer program product of claim 21, wherein the set of devices are a set of physical processors mapped to an unequal set of logical processors.

24. The computer program product of claim 23, wherein the second sub instructions for changing the logical processor configuration includes:
   third sub-instructions for assigning a corresponding logical processor mapped to the selected physical processor to another physical processor.

25. A computer program product in a computer readable medium for managing a set of physical processors mapped to a set of logical processors, the computer program product comprising:
   first instructions for receiving an alert from an operating system, wherein the alert is at least one of a power alert and a thermal alert; and
   second instructions for altering operation of a selected physical processor within the set of physical processors in response to the alert, wherein at least one of power usage and generation of heat by the selected physical processor is reduced, wherein the second instructions for altering includes instructions for altering the operation of the selected physical processor by turning off the selected physical processor and instructions for changing, without intervention by the operating system, mapping of the set of physical processors and the set of logical processors to reflect the selected physical processor's altered operation.

26. The computer program product of claim 25 wherein the instructions for changing comprises:
   third instructions for reassigning a logical processor mapped to the selected physical processor the altering step causes the selected physical processor to be unavailable.

27. The computer program product of claim 26 further comprising:
   fourth instructions for altering operation of the selected physical processor back to an original state present before the alert if another alert is received canceling the alert; and
   fifth instructions for reassigning the logical processor back to the selected physical processor.

28. A logically partitioned data processing system for executing a plurality of operating systems, each one of the plurality of operating systems executing in a respective logical partition of the data processing system, comprising:
   a bus system;
   a memory connected to the bus system, wherein the memory includes a set of instructions; and
   a processing unit connected to the bus system, wherein the processing unit executes the set of instructions to receive an alert through a sub-processor partitioning call, wherein the alert is at least one of a power alert and a thermal alert; and alter operation of a selected device within a set of devices in response to the alert without intervention by any of the operating systems, wherein at least one of power usage and generation of heat by the selected device is reduced.

* * * * *